(12) United States Patent
LeMieux et al.

(10) Patent No.: US 7,059,822 B2
(45) Date of Patent: Jun. 13, 2006

(54) METHODS AND APPARATUS FOR MEASURING WIND TURBINE BLADE DEFLECTION

(75) Inventors: David Lawrence LeMieux, Tehachapi, CA (US); Aaron John Avagliano, Clifton Park, NY (US); Joseph Lucian Smolenski, Slingerlands, NY (US); Russell Stephen DeMuth, Berne, NY (US)

(73) Assignee: General Electrick Company, Schenectady, NY (US)

( * ) Notice: Subject to any disclaimer, the term of this patent is extended or adjusted under 35 U.S.C. 154(b) by 148 days.

(21) Appl. No.: 10/880,855

(22) Filed: Jun. 30, 2004

(65) Prior Publication Data

US 2006/0000269 A1    Jan. 5, 2006

(51) Int. Cl.
*F03B 15/06* (2006.01)

(52) U.S. Cl. .................... 415/4.3; 415/118; 416/61

(58) Field of Classification Search ............. 415/4.1, 415/4.3, 4.5, 14, 118; 416/1, 31, 61
See application file for complete search history.

(56) References Cited

U.S. PATENT DOCUMENTS

| | | | | |
|---|---|---|---|---|
| 3,515,485 A | * | 6/1970 | Frank ................. | 356/141.2 |
| 4,887,468 A | | 12/1989 | McKendree et al. | |
| 5,249,470 A | * | 10/1993 | Hadley et al. ............. | 73/655 |
| 6,619,918 B1 | | 9/2003 | Rebsdorf | |
| 2004/0057828 A1 | | 3/2004 | Bosche | |

* cited by examiner

*Primary Examiner*—Edward K. Look
*Assistant Examiner*—Dwayne J White
(74) *Attorney, Agent, or Firm*—James E. McGinness; Armstrong Teasdale LLP (57) ABSTRACT

A method for determining rotor blade deflection, wherein a rotor blade is coupled to a hub, includes coupling a first end of a beam to the rotor blade, positioning a second end of the beam adjacent the hub, measuring the deflection of the beam using at least one sensor, and determining the deflection of the blade based on the deflection of the beam.

20 Claims, 6 Drawing Sheets

METHODS AND APPARATUS FOR MEASURING WIND TURBINE BLADE DEFLECTION

BACKGROUND OF THE INVENTION

This invention relates generally to wind turbines, and more particularly to methods and apparatus for measuring wind turbine blade deflection.

Wind power is quickly becoming a growing energy source around the world. As such, wind turbines are increasing in size and capacity. Specifically, to increase energy output, rotor blade length is increased while rotor blade weight is decreased. Due to this increase in size and decrease in weight, the rotor blades are subject to greater deflection forces. However, due to the greater deflection forces, the risk of one of the rotor blades striking the wind turbine tower is increased. In addition, rotor blade deflection produces fatigue in the rotor blades and other wind turbine components. To minimize fatigue, many modern wind turbines use rotor blade pitch control strategies that require measuring the deflection of one or more rotor blades.

Known wind turbines include sensors for detecting rotor blade deflection. These sensors are typically mounted on the rotor blades. Accordingly, communication signals and/or power cables must be provided across a pitch axis of the rotor blades. As such, known wind turbines utilize slip ring, twisted-wire, or radio-frequency methods to bring the communication or power cables from the rotor blade to the rotor hub. However, these techniques increase assembly and maintenance time, and increase the complexity of obtaining data relating to the rotor blade deflection. Accordingly, measurement techniques of the kind presently in use have not previously provided blade deflection measurements in a cost effective and reliable manner.

BRIEF DESCRIPTION OF THE INVENTION

In one aspect, a method for determining rotor blade deflection is provided, wherein a rotor blade is coupled to a hub. The method includes coupling a first end of a beam to the rotor blade, positioning a second end of the beam adjacent the hub, measuring the deflection of the beam using at least one sensor, and determining the deflection of the blade based on the deflection of the beam.

In another aspect, an apparatus for determining the deflection of a rotor blade is provided, wherein the rotor blade is coupled to a hub of a rotor. The apparatus includes a beam having a first end and a second end, wherein the first end is configured to be coupled to the rotor blade, and the second end is configured to extend at least partially within the hub. The apparatus also includes at least one sensor configured to be positioned within the hub for measuring the deflection of the beam.

In yet another aspect a wind turbine is provided that includes a tower having a first end and a second end, a nacelle mounted to the tower first end, and a rotor coupled to the nacelle. The rotor includes a hub and at least one rotor blade extending outwardly from the hub. The wind turbine also includes at least one beam, wherein each beam extends at least partially into one of the at least one rotor blades and extends at least partially into the hub. The wind turbine further includes at least one sensor positioned within the hub for measuring deflection of the at least one beam.

DETAILED DESCRIPTION OF THE INVENTION

Figure 1:
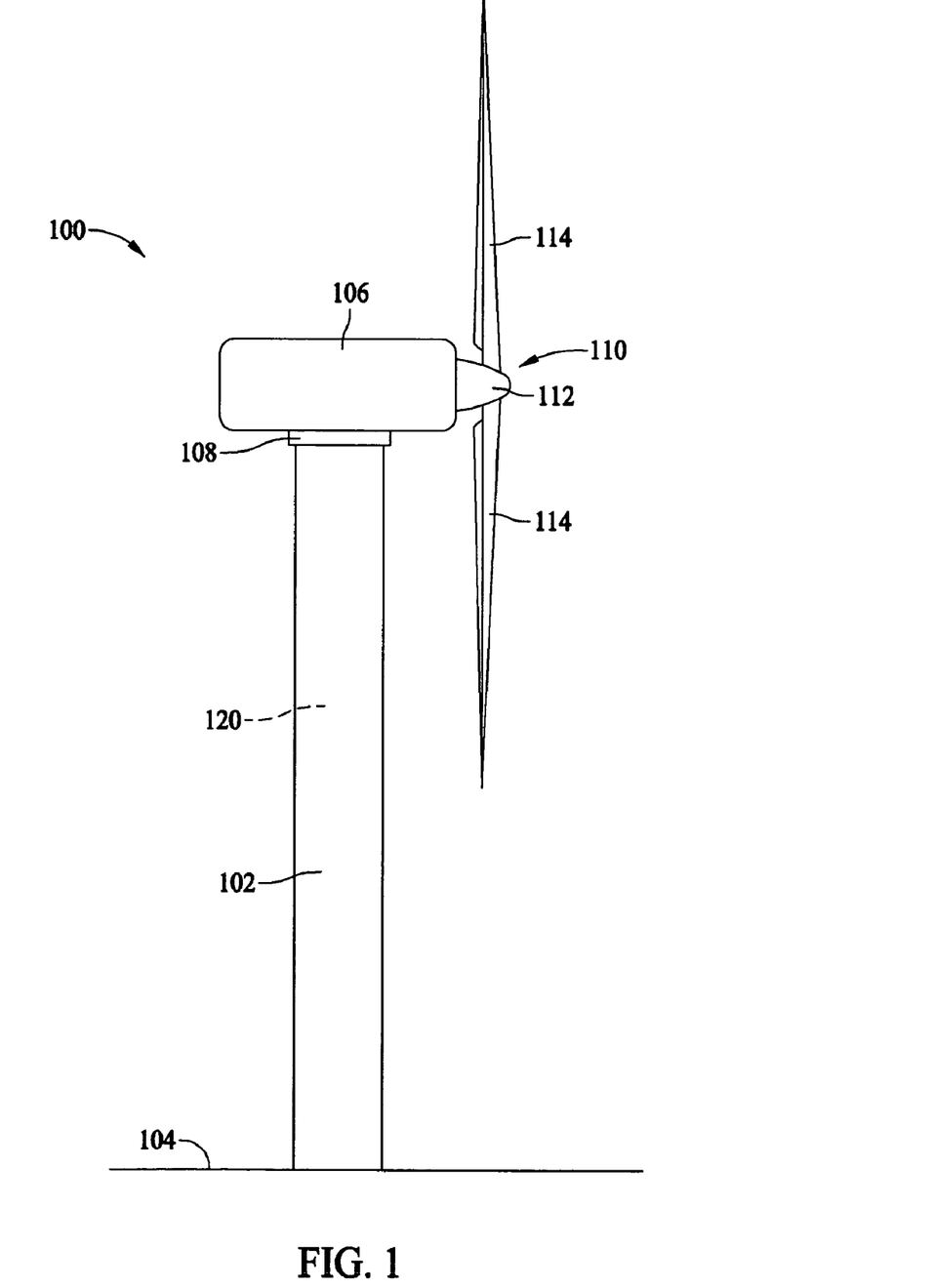
FIG. 1 is a side elevational view of a wind turbine.

FIG. 1 is a side elevational view of a wind turbine 100, such as, for example, a horizontal axis wind turbine. Wind turbine 100 includes a tower 102 extending from a supporting surface 104, a nacelle 106 mounted on a bedframe 108 of tower 102, and a rotor 110 coupled to nacelle 106. Rotor 110 includes a hub 112 and a plurality of rotor blades 114 coupled to hub 112. In the exemplary embodiment, rotor 110 includes three rotor blades 114. In an alternative embodiment, rotor 110 includes more or less than three rotor blades 114. In the exemplary embodiment, tower 102 is fabricated from tubular steel and includes a cavity 120 extending between supporting surface 104 and nacelle 106. Alternatively, tower 102 may be, for example, a lattice tower. It is appreciated, however, that the benefits and advantages of the invention may occur in a variety of structures, such as wind turbine 100, that have a rotor, such as rotor 110, and rotor blades, such as rotor blades 114. As such, while the invention is described and illustrated in the context of wind turbine 100, the invention is not intended to be limited thereto. It is recognized that the invention can be utilized in a variety of systems and for a variety of applications.

In use, blades 114 are positioned about rotor hub 112 to facilitate rotating rotor 110 to transfer kinetic energy from the wind into usable mechanical energy. As the wind strikes blades 114, and as blades 114 are rotated and subjected to centrifugal forces, blades 114 are subjected to various bending moments. As such, blades 114 deflect and/or rotate from a neutral, or non-deflected, position to a deflected position. Moreover, a pitch angle of blades 114 can be changed by a pitching mechanism (not shown) to facilitate increasing or decreasing blade 114 speed, and to facilitate reducing tower 102 strike.

Figure 2:
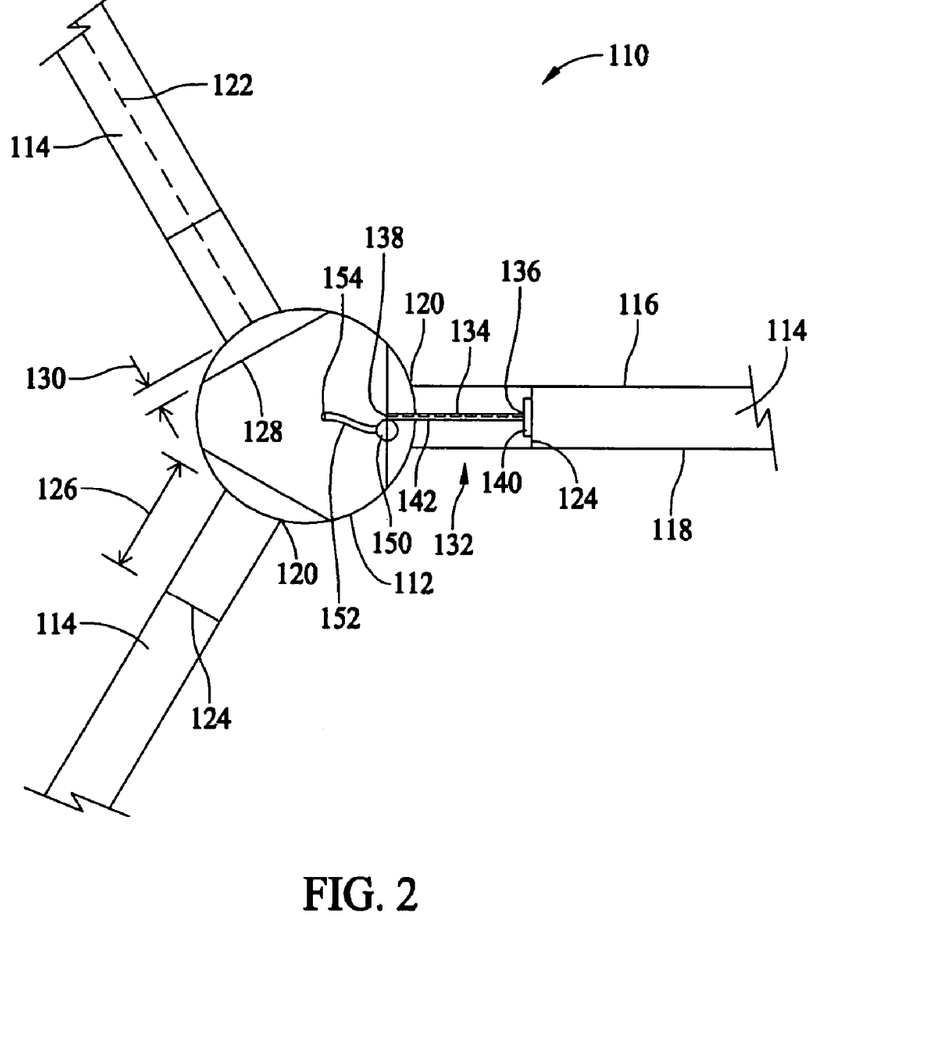
FIG. 2 is a side view of an exemplary blade deflection measuring assembly that can be used with the wind turbine shown in FIG. 1.

FIG. 2 illustrates a side view of rotor 110 including rotor hub 112 and rotor blades 114. In the exemplary embodiment, rotor blade 114 includes side edges 116 and 118 and a hub connection end 120 that is coupled to hub 112 at a pitch axis (not shown). In one embodiment, a pitch axis bearing (not shown) is coupled between rotor blade 114 and hub 112. A blade longitudinal axis 122 extends along blade from end 120 generally parallel to side edges 116 and 118. In one embodiment rotor blade 114 includes a baffle 124 extending between side edges 116 and 118 generally perpendicular to axis 122. Baffle 124 is positioned a distance 126 from blade end 120. In the exemplary embodiment, hub 112 includes a plurality of fixed frame members 128 positioned proximate rotor blades 114. In one embodiment, fixed frame members 128 extend substantially parallel to blade end 120, and are located a distance 130 from blade end 120.

Rotor 110 also includes a blade deflection measuring assembly 132 that includes a beam 134 extending between a first end 136 and a second end 138. In the exemplary embodiment, beam first end 136 is coupled to baffle 124 such that beam extends substantially orthogonally with respect to baffle 124 and beam second end 138 is coupled to fixed frame member 128. Optionally, a bearing 140 is coupled between baffle 124 and beam first end 136. Specifically, bearing 140 is fixedly attached to baffle 124 prior to coupling beam 134 to bearing 140. Bearing 140 facilitates transferring blade 114 deflection and bending from baffle 124 to beam 134. Moreover, beam 134 has a longitudinal axis 142 that extends between beam first end 136 and beam second end 138. In one embodiment, beam axis 142 is substantially aligned with blade axis 122. As such, beam 134 movement corresponds with blade 114 movement such that beam 134 moves between a neutral position, where beam 134 is in a non-deflected state, and a deflected position, where beam 134 is in a deflected state. In one embodiment, beam 134 deflection is substantially similar to blade 114 deflection such that a direct correlation is made between an amount of beam 134 deflection and an amount of blade 114 deflection. As such, blade 114 deflection is computed as a function of beam 134 deflection.

Blade deflection measuring assembly 132 also includes at least one sensor 150 for measuring beam 134 and/or blade 114 deflection and/or bending. Sensor 150 is positioned within hub 112. As such, sensor 150 facilitates reducing mounting and/or repair complexity and/or time, and sensor 150 facilitates reducing exposure to external elements, such as, but not limited to, whether and lightning. In the exemplary embodiment, sensor 150 is coupled to fixed frame member 128 proximate beam second end 138. In another embodiment, sensor 172 is coupled to the pitch axis bearing (not shown). In one embodiment, sensor 150 is a device such as, but not limited to, a strain gauge that is attached to beam 134 and that measures the deflection of beam 134 relative to a neutral position of beam 134. In an alternative embodiment, sensor 150 is another device, such as, but not limited to, an optical sensor, an inductive sensor, or an acoustical sensor. In the exemplary embodiment, a wire 152 is coupled to sensor 150 and extends from sensor 150 through a hub central axis 154 to a processor (not shown) for analyzing the data gathered by sensor 150 and for computing and determining corresponding blade 114 deflection. As such, because wires 152 extend through hub central axis 154, wires 152 are not subject to wire twist.

In use, as blade 114 is deflected, that deflection is transferred by baffle 124 to bearing 140. Bearing 140 then transfers blade 114 deflection to beam 134. Beam 134 extends through blade end 120 into hub 112 where beam second end 138 is coupled to fixed frame member 128. Sensor 150 senses and/or measures beam 134 deflection and transmits data relating to beam 134 deflection to the processor for determining blade 114 deflection based on beam 134 deflection.

Figure 3:
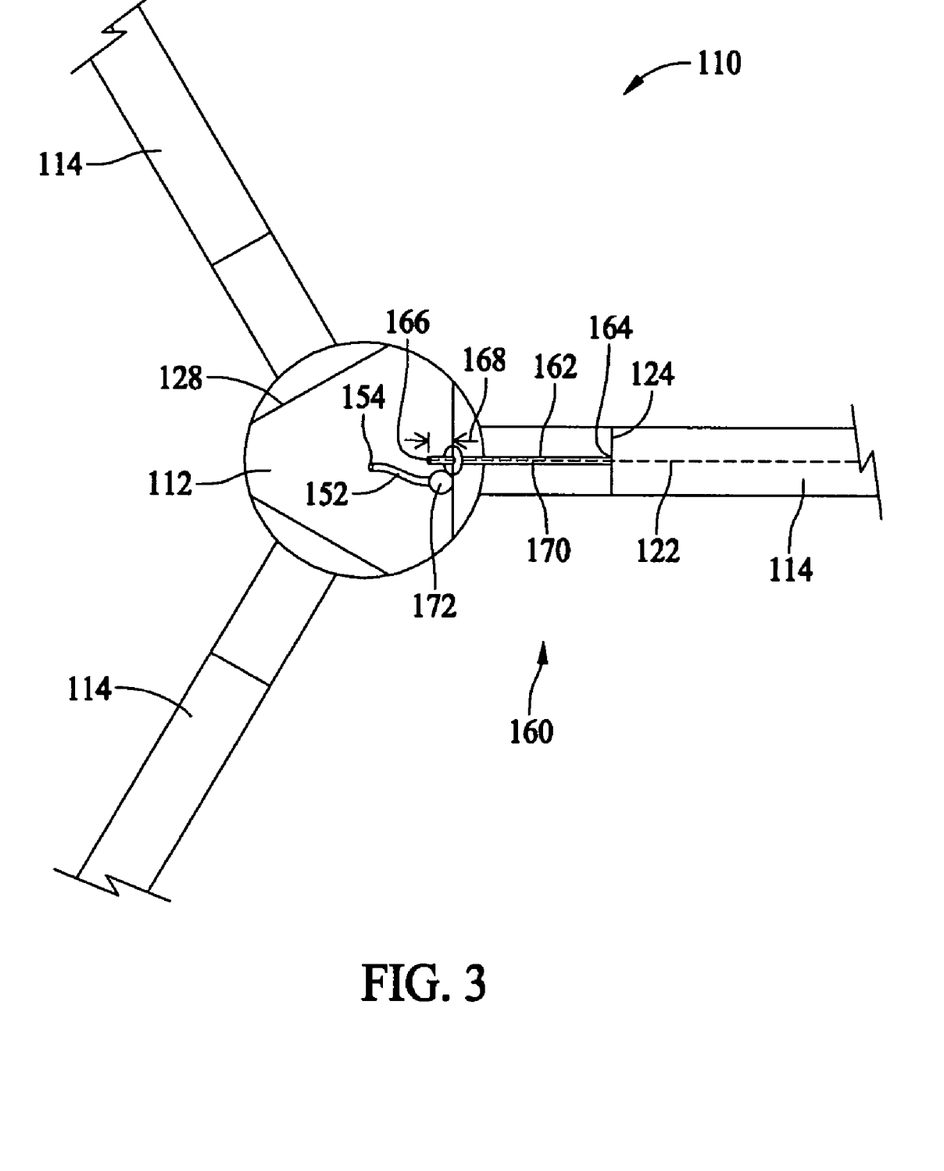
FIG. 3 is a side view of an alternative blade deflection measuring assembly.
Figure 4:
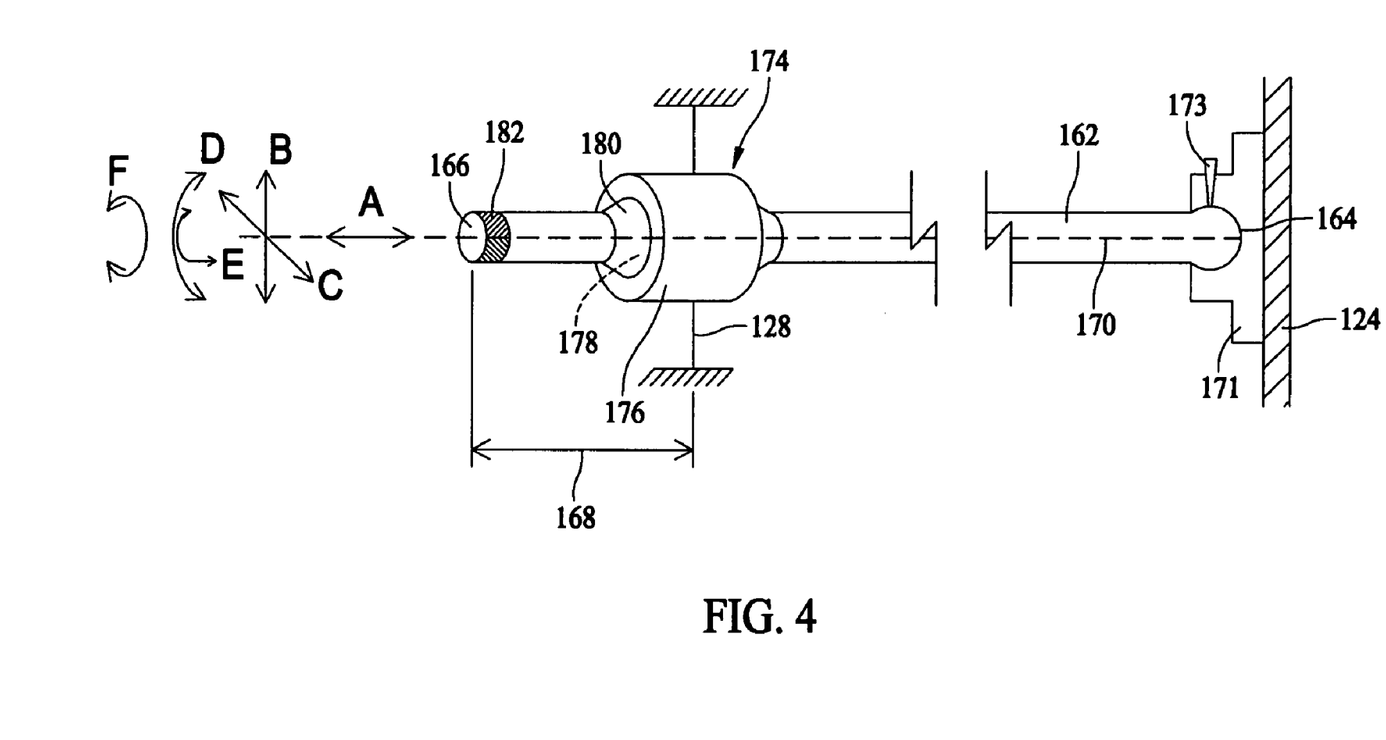
FIG. 4 is a schematic illustration of a portion of the blade deflection measuring assembly shown in FIG. 3.

FIG. 3 illustrates a side view of an alternative blade deflection measuring assembly 160. FIG. 4 is a schematic illustration of a portion of blade deflection measuring assembly 160. Measuring assembly 160 is substantially similar to measuring assembly 132 (described above in relation to FIG. 2) except as noted below. Like reference characters of measuring assembly 132 are therefore used with like features of measuring assembly 160 where applicable in FIG. 3. Rotor 110 includes rotor hub 112, rotor blades 114, and blade deflection measuring assembly 160.

Measuring assembly 160 includes a beam 162 extending between a first end 164 and a second end 166. In the exemplary embodiment, beam first end 164 is coupled to baffle 124 and beam second end 166 is positioned proximate fixed frame member 128, such that beam second end 166 is positioned a distance 168 from fixed frame member 128. In an alternative embodiment, a bearing (not shown) is coupled between baffle 124 and beam first end 164. Moreover, beam 162 has a longitudinal axis 170 that extends between beam first end 164 and beam second end 166. In one embodiment, beam axis 170 is substantially aligned with blade axis 122. In another embodiment, beam axis 170 is off-set with respect to blade axis 122.

As shown in FIG. 4, beam 162 is coupled to blade 114 using a ball-in-socket connection. Specifically, beam second end 166 is connected to a socket 171 via a pin 173. Pin 173 transfers deflection of blade 114 to beam 162. Specifically, beam 162 rotates with blade 114 as the pitch angle of blade 114 changes, and beam 162 deflects as blade 114 is subject to edgewise and/or flapwise deflection. As such, beam 162 movement corresponds with blade 114 movement such that beam 162 162 moves between a neutral position, where beam 162 is in a non-deflected state, and a deflected position, where beam 162 is in a deflected state. Specifically, beam movement is one of axial movement, indicated by arrow A, radial movement, indicated by arrows B and C, angular movement, indicated by arrows D and E, or rotational movement, indicated by arrow F. In one embodiment, beam 162 deflection corresponds to blade 114 deflection such that a direct correlation is made between an amount of beam 162 deflection and an amount of blade 114 deflection. As such, blade 114 deflection is computed as a function of beam 162 deflection such that beam 162 rotation and angle change are used to determine corresponding blade 114 pitch angle and bending moment. In an alternative embodiment, beam 162 is coupled to blade 114 using other connection techniques.

Blade deflection measuring assembly 160 also includes at least one sensor 172 and a support mechanism 174 for measuring beam 162 and/or blade 114 deflection and bending. In one embodiment, sensor 172 is positioned within hub 112. Specifically, sensor 172 is positioned within a housing (not shown) proximate beam second end 166. In another embodiment, sensor 172 is coupled to the pitch axis bearing (not shown). In the exemplary embodiment, sensor 172 is coupled to support mechanism 174. In another embodiment, sensor 172 is coupled to fixed frame member 128 proximate beam second end 166. In one embodiment, sensor 172 is a device such as, but not limited to, a magnetic field sensor that measures the deflection of beam 162 relative to beam 162 neutral position. In an alternative embodiment, sensor 172 is another device, such as, but not limited to, an optical sensor or an inductive sensor that measures the deflection of beam 162.

As shown in FIG. 4, support mechanism 174 includes a body 176 and a bore 178 extending through body 176. In the exemplary embodiment, body 176 has a substantially circular cross-sectional profile. However, in an alternative embodiment, body 176 has a non-circular cross-sectional profile, such as, but not limited to, a rectangular, a triangular, or an asymmetrical cross-sectional profile. Support mechanism 174 is positioned within hub 112. In the exemplary embodiment, support mechanism 174 is coupled to fixed frame member 128 proximate beam second end 166. Bore 178 extends through body 176 along a line that is substantially parallel with beam axis 170 such that beam second end 166 extends through bore 178 and a sliding bearing 180 extends between beam 162 and support mechanism 174. Sliding bearing 180 facilitates allowing movement of beam 162 with respect to support mechanism 174 and sensor 172. Specifically, beam 162 is free to move substantially parallel to beam axis 170, substantially perpendicular to beam axis 170, and/or rotationally about beam axis 170. In one embodiment, beam 162 extends through bore 178. As such, beam second end 166 is positioned adjacent sensor 172.

In the exemplary embodiment, beam 162 includes a plurality of magnets 182 located proximate beam second end 166. Magnets 182 are positioned adjacent sensor 172. Sensor 172, such as, but not limited to, a magnetic field sensor, measures the magnetic field emitted by magnets 182 to detect the deflection of beam 162. Specifically, sensor 172 detects the intensity of the magnetic field produced by magnets 182 to determine movement of beam second end 166 in a direction that is substantially parallel to beam axis 170, substantially perpendicular to beam axis 170, and/or rotationally about beam axis 170. As such, the axial, radial, angular and/or rotational displacement of beam 162 is measured by sensor 172. Alternatively, beam 162 includes an optical target (not shown) that utilizes a sensor, such as, but not limited to, an optical sensor (not shown) to measure beam 162 deflection. As such, sensor 172 identifies the coordinates of beam 162 in the deflected position relative to the non-deflected position.

In the exemplary embodiment, wire 152 coupled to sensor 172 extends from sensor 172 through hub central axis 154 to the processor (not shown) for analyzing the data gathered by sensor 172 and for computing and determining corresponding blade 114 deflection. As such, because wires 152 extend through hub central axis 154, wires 152 are not subject to wire twist.

In use, as blade 114 is deflected, that deflection is transferred by baffle 124 to beam 162. Beam 162 extends through blade end 120 into hub 112 where beam second end 166 is positioned proximate support mechanism 174 and sensor 172. Specifically, beam second end 166 extends through bore 178 and magnets 182 are positioned adjacent sensor 172. Sensor 172 senses and/or measures beam 162 deflection and transmits data relating to beam 162 deflection to the processor for determining blade 114 deflection based on beam 162 deflection.

Figure 5:
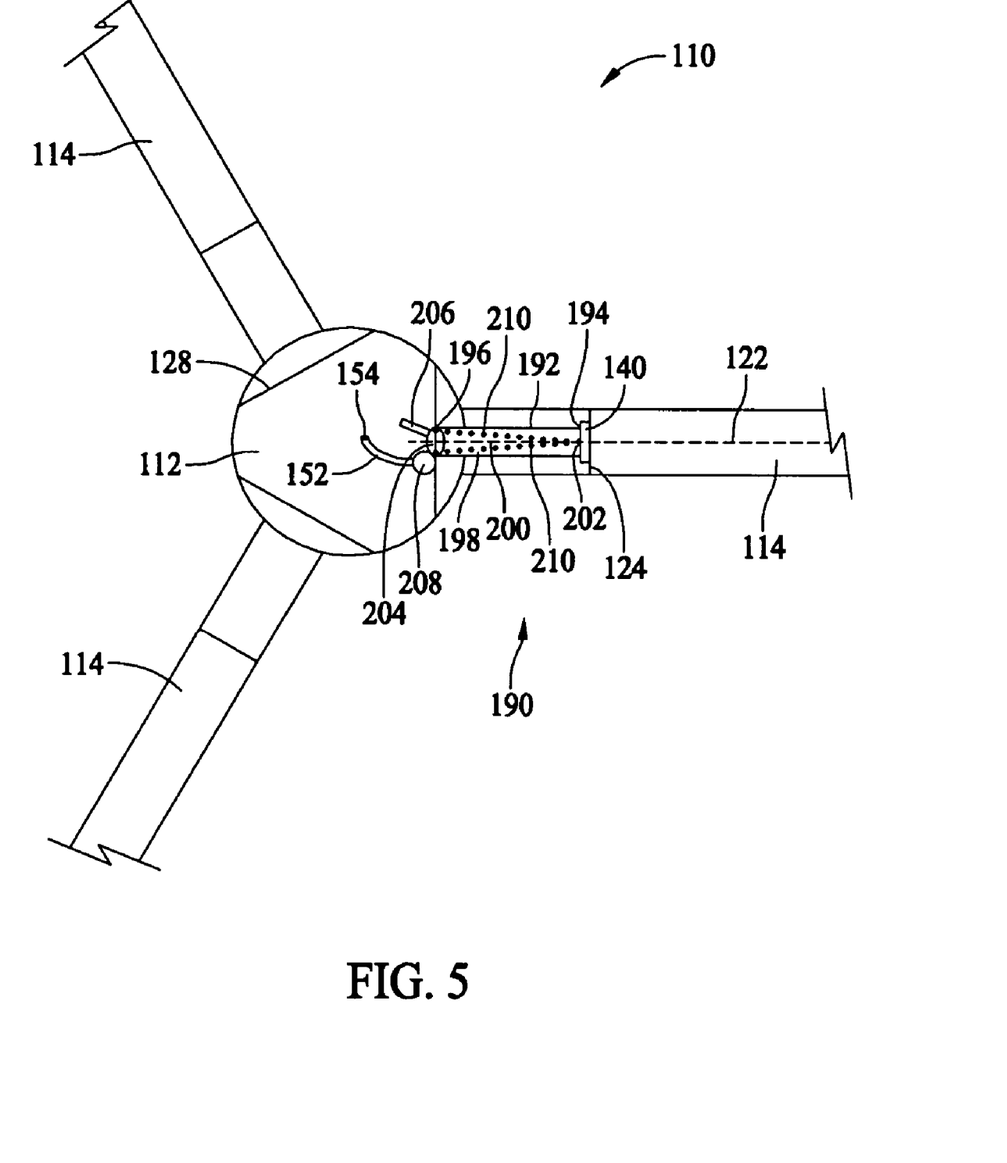
FIG. 5 is a side view of another alternative blade deflection measuring assembly.

FIG. 5 illustrates a side view of an alternative blade deflection measuring assembly 190. Measuring assembly 190 is substantially similar to measuring assemblies 132 and 160 (described above in relation to FIGS. 2 and 3 respectively) except as noted below. Like reference characters of measuring assemblies 132 and 160 are therefore used with like features of measuring assembly 190 where applicable in FIG. 5. Rotor 110 includes rotor hub 112, rotor blades 114, and blade deflection measuring assembly 190.

Measuring assembly 190 includes a beam 192 extending between a first end 194 and a second end 196. In the exemplary embodiment, beam first end 194 is coupled to baffle 124 and beam second end 196 is coupled to fixed frame member 128. In one embodiment, bearing 140 is coupled between baffle 124 and beam first end 194. Specifically, bearing 140 is fixedly attached to baffle 124 prior to coupling beam 192 to bearing 140. Bearing 140 facilitates allowing blade 114 to rotate in the pitch axis without causing torsional shear damage to beam 192.

In the exemplary embodiment, beam 192 includes a hollow cavity 198 extending between beam first end 194 and beam second end 196 along a beam longitudinal axis 200. In one embodiment, beam axis 200 is substantially aligned with blade axis 122. In the exemplary embodiment, beam 192 is fabricated from, for example, a poly-vinyl-chloride plastic tubing. Beam 192 includes a mirror 202 positioned within cavity 198 and a target 204, or detector, positioned within cavity 198. In the exemplary embodiment, mirror 202 is positioned proximate beam first end 194 and target 204 is positioned proximate beam second end 196. Optionally, target 204 is fabricated from a transparent material, such as, but not limited to, a transparent silicone plate.

Blade deflection measuring assembly 190 also includes a structured light source, such as, but limited to, a laser 206 and at least one sensor 208 for measuring beam 192 and/or blade 114 deflection and bending. In one embodiment, laser 206 is located within hub 112 and is positioned proximate beam 192. Laser 206 emits a laser beam 210 through cavity 198. Specifically, laser beam 210 projects through target 204 and is reflected off mirror 202 back towards target 204. In the exemplary embodiment, laser 206 projects a two-dimensional shape, such as, but not limited to, a cross-hair shape or X-shape. Alternatively, other shapes capable of indicating translation and/or rotation of blade 114 are projected by laser 206. In another embodiment, measuring assembly 190 includes more than one laser 206.

Sensor 208 is positioned within hub proximate target 204 such that sensor 208 measures the displacement and/or the rotation of laser beam 210 on target 204 relative to a calibrated or non-deflected point of intersection. In one embodiment, target 204 is coupled to sensor 208. In one embodiment, sensor 208 is a device such as, but not limited to, an optical sensor that measures the deflection of the intersection of laser beam 210 and target 204. Specifically, sensor 208 measures the coordinates of a deflected point of intersection of laser beam 210 and target 204, and compares the coordinates with the non-deflected point of intersection. Moreover, as blade 114 is deflected, beam 192 is also deflected, thereby causing mirror 204 to reflect laser beam 210 to the deflected point of intersection. As such, laser beam 210 is subject to horizontal displacement, vertical displacement, and/or rotational displacement. Sensor 208 measures the displacement of the deflected point of intersection and, from the data gathered by sensor 208, processor (not shown) is able to compute the corresponding blade 114 deflection. Specifically, horizontal and/or vertical displacement result from flapwise and/or edgewise deflection of blade 114. Moreover, rotational displacement results from dynamic twist of blade 114 or changes in the blade 114 pitch angle by the actuator system (not shown).

In use, as blade 114 is deflected, that deflection is transferred by baffle 124 to bearing 140. Bearing 140 then transfers blade 114 deflection to beam 134. Beam 192 extends through blade end 120 into hub 112 where beam second end 196 is positioned proximate laser 206 and sensor 172. Laser 206 projects laser beam 210 through cavity 198 onto mirror 202 which deflects laser beam 210 onto target 204. Sensor 172 senses and/or measures laser beam 210 deflection and transmits data relating to laser beam 210 deflection to the processor for determining blade 114 deflection based on beam 192 deflection.

Figure 6:
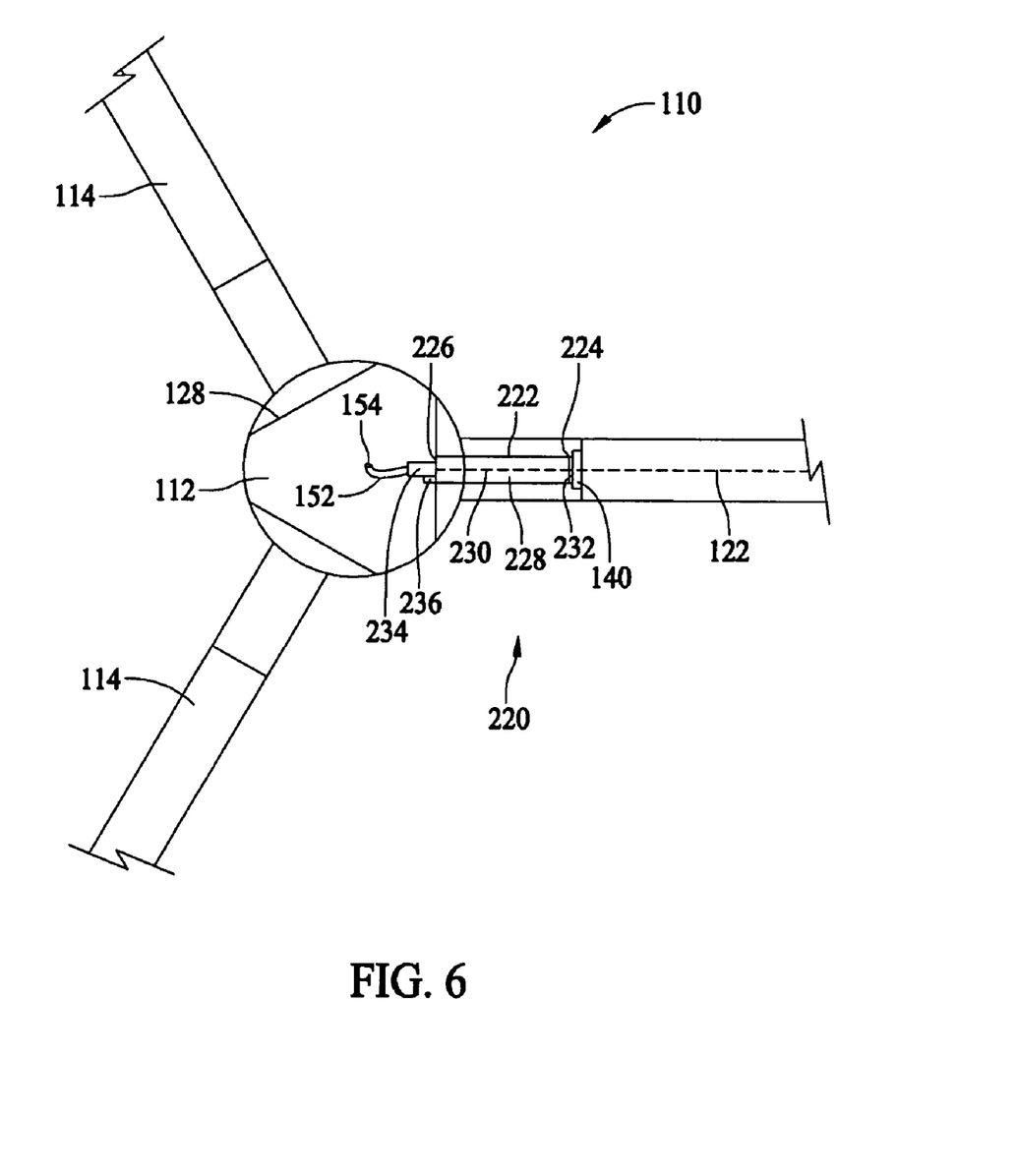
FIG. 6 is a side view of another alternative blade deflection measuring assembly.

FIG. 6 illustrates a side view of an alternative blade deflection measuring assembly 220. Measuring assembly 220 is substantially similar to measuring assembly 190 (described above in relation to FIG. 5) except as noted below. Like reference characters of measuring assembly 190 are therefore used with like features of measuring assembly 220 where applicable in FIG. 6. Rotor 110 includes rotor hub 112, rotor blades 114, and blade deflection measuring assembly 220.

Measuring assembly 220 includes a beam 222 extending between a first end 224 and a second end 226. In the exemplary embodiment, beam first end 224 is coupled to baffle 124 and beam second end 226 is coupled to fixed frame member 128. In one embodiment, bearing 140 is coupled between baffle 124 and beam first end 224. Specifically, bearing 140 is fixedly attached to baffle 124 prior to coupling beam 222 to bearing 140. Bearing 140 facilitates allowing blade 114 to rotate in the pitch axis without causing torsional shear damage to beam 222.

In the exemplary embodiment, beam 222 includes a hollow cavity 228 extending between beam first end 224 and beam second end 226 along a beam longitudinal axis 230. In one embodiment, beam axis 230 is substantially aligned with blade axis 122. In the exemplary embodiment, beam 222 is fabricated from, for example, a poly-vinyl-chloride plastic tubing. Beam 222 includes a target 232 positioned within cavity 228. In the exemplary embodiment, target 232 is positioned proximate beam first end 224.

Blade deflection measuring assembly 220 also includes at least one sensor 234 for measuring beam 222 and/or blade 114 deflection and bending, and a structured light source, such as, but limited to, an illuminator 236 for providing illumination for sensor 234. In one embodiment, sensor 234 is located within hub 112 and is positioned proximate beam 222. In the exemplary embodiment, sensor 234 is an optical sensor, such as, but not limited to, a camera.

Sensor 234 is positioned within hub 112 proximate beam 222 such that sensor 234 measures the displacement and/or the rotation of target 232 relative to a calibrated or non-deflected orientation of target 232. Specifically, sensor 236 measures the coordinates of the deflected orientation of target 234, and compares the coordinates with the non-deflected orientation. Moreover, as blade 114 is deflected, beam 222 is also deflected, thereby causing target 232 to deflect. As such, target 232 is subject to horizontal displacement, vertical displacement, and/or rotational displacement. From the data gathered by sensor 234, processor (not shown) is able to compute the corresponding blade 114 deflection. Specifically, horizontal and/or vertical displacement result from flapwise and/or edgewise deflection of blade 114. Moreover, rotational displacement results from dynamic twist of blade 114 or changes in the blade 114 pitch angle by the actuator system (not shown). In an alternative embodiment, measuring assembly 220 includes a plurality of targets 234 positioned over the length of blade such that sensor 236 measures the deflection of blade 114 at multiple positions.

The above-described blade deflection measuring assembly is fabricated in a cost-effective and reliable manner. The blade deflection measuring assembly includes a beam coupled between the hub and the rotor blade and a sensor for measuring the deflection of the beam. Specifically, the sensors are coupled to the fixed frame of the hub and wires are coupled to the sensor and positioned within the hub. As a result, blade deflection measuring assembly facilitates measuring rotor blade deflection in a reliable and cost-effective manner.

Exemplary embodiments of a blade deflection measuring assembly are described above in detail. The assembly is not limited to the specific embodiments described herein, but rather, components of each assembly may be utilized independently and separately from other components described herein. For example, each blade deflection measuring assembly component can also be used in combination with other blade deflection measuring assembly components.

While the invention has been described in terms of various specific embodiments, those skilled in the art will recognize that the invention can be practiced with modification within the spirit and scope of the claims.

What is claimed is:

1. A method for determining rotor blade deflection, wherein a rotor blade is coupled to a hub, said method comprising:
    coupling a first end of a beam to the rotor blade;
    positioning a second end of the beam adjacent the hub;
    measuring the deflection of the beam using at least one sensor; and
    determining the deflection of the blade based on the deflection of the beam.

2. A method in accordance with claim 1 wherein the rotor blade includes a baffle located a distance from an end of the rotor blade and a bearing rigidly connected to the baffle, said coupling a first end of a beam to the rotor blade comprises coupling the beam to the bearing.

3. A method in accordance with claim 1 wherein the hub includes at least one support mechanism, said positioning a second end of the beam adjacent the hub comprises positioning the beam second end adjacent the support mechanism such that the at least one sensor measures the deflection of said beam by measuring at least one of a displacement of said beam second end and a rotation of said beam second end.

4. A method in accordance with claim 1 wherein the hub includes at least one fixed frame member, said positioning a second end of the beam adjacent the hub comprises coupling the second end of the beam to at least one of the fixed frame members such that the at least one sensor measuring the deflection of the beam measures at least one of a displacement of the beam and a rotation of the beam relative to a non-deflected calibrated position of the beam.

5. A method in accordance with claim 1 wherein said measuring the deflection of the beam using at least one sensor comprises measuring the deflection of the beam using at least one of a strain gauge, a magnetic field sensor, an inductive sensor, an optical sensor, and an acoustic sensor.

6. An apparatus for determining deflection of a rotor blade that is coupled to a hub of a rotor, said apparatus comprising:
    a beam comprising a first end and a second end, said first end configured to be coupled to the rotor blade, said second end configured to extend at least partially within the hub; and
    at least one sensor configured to be positioned within the hub for measuring the deflection of said beam.

7. An apparatus in accordance with claim 6 wherein the rotor blade includes a baffle located a distance from an end of the rotor blade, said beam configured to be coupled to the baffle.

8. An apparatus in accordance with claim 6 wherein the rotor blade includes a baffle located a distance from an end of the rotor blade and a bearing rigidly connected to the baffle, said beam configured to be coupled to the bearing.

9. An apparatus in accordance with claim 6 wherein the hub includes at least one fixed frame member, said beam configured to be coupled to one of the at least one fixed frame members, said at least one sensor configured to be coupled to one of the at least one fixed frame members proximate said beam second end and configured to measure the deflection of said beam.

10. An apparatus in accordance with claim 6 wherein said at least one sensor comprises at least one of a strain gauge, a magnetic field sensor, an inductive sensor, an optical sensor, and an acoustic sensor.

11. An apparatus in accordance with claim 6 wherein the rotor blade includes a baffle located a distance from an end of the rotor blade and the hub includes at least one fixed frame member and a support mechanism coupled to one of the at least one fixed frame members, said beam first end configured to be coupled to the baffle, said beam second end comprises at least one of a magnet and an optical target, said beam second end configured to extend at least partially into the support mechanism, said at least one sensor configured to measure the deflection of said beam by measuring at least one of a displacement of said beam second end and a rotation of said beam second end.

12. An apparatus in accordance with claim 6 wherein said beam comprises a hollow cavity extending between said beam first end and said beam second end and at least one of a mirror and a target coupled to said beam within said cavity proximate said beam first end.

13. An apparatus in accordance with claim 12 further comprising a target configured to be coupled to said beam within said cavity proximate said beam second end and a laser configured to be positioned proximate said target within the hub, said laser configured to emit a laser beam toward said mirror, said mirror configured to reflect the laser beam onto said target, said at least one sensor configured to measure the deflection of said beam by measuring at least one of a displacement of the laser beam and a rotation of the laser beam.

14. A wind turbine comprising:
a tower having a first end and a second end;
a nacelle mounted to said tower first end;
a rotor coupled to said nacelle, said rotor comprising a hub and at least one rotor blade extending outwardly from said hub;
at least one beam, each said beam extending at least partially into one of said rotor blades and extending at least partially into said hub; and
at least one sensor positioned within said hub for measuring deflection of said at least one beam.

15. A wind turbine in accordance with claim 14 wherein said rotor blade comprises a baffle located a distance from an end of said rotor blade, said beam coupled to said baffle.

16. A wind turbine in accordance with claim 14 wherein said hub includes at least one fixed frame member, said beam configured to be coupled to one of said at least one fixed frame members, said at least one sensor coupled to one of said at least one fixed frame members proximate said beam second end such that said at least one sensor configured to measure the deflection of said beam.

17. A wind turbine in accordance with claim 14 wherein said at least one sensor comprises at least one of a strain gauge, a magnetic field sensor, an inductive sensor, an optical sensor, and an acoustic sensor.

18. A wind turbine in accordance with claim 14 wherein said rotor blade comprises a baffle located a distance from an end of said rotor blade and said hub comprises at least one fixed frame member and a support mechanism coupled to one of said at least one fixed frame members, said beam first end coupled to said baffle, said beam second end comprises at least one of a magnet and an optical target, said beam second end extending at least partially into said support mechanism, said at least one sensor configured to measure the deflection of said beam by measuring at least one of a displacement of said beam second end and a rotation of said beam second end.

19. A wind turbine in accordance with claim 14 wherein said beam comprises a hollow cavity extending between said beam first end and said beam second end, said wind turbine further comprising:
a mirror coupled to said beam within said cavity proximate said beam first end;
a target coupled to said beam within said cavity proximate said beam second end; and
a laser positioned proximate said target within said hub, said laser configured to emit a laser beam toward said mirror, said mirror configured to reflect the laser beam onto said target, said at least one sensor configured to measure the deflection of said beam by measuring at least one of a displacement of the laser beam and a rotation of the laser beam.

20. A wind turbine in accordance with claim 14 wherein said beam comprises a hollow cavity extending between said beam first end and said beam second end, said wind turbine further comprising:
at least one target coupled to said beam within said cavity proximate said beam first end; and
a camera positioned proximate said beam second end within said hub, said camera configured to measure the deflection of said beam by measuring at least one of a displacement and a rotation of said target.

* * * * *